US006492899B1

(12) United States Patent
Yamaguchi

(10) Patent No.: US 6,492,899 B1
(45) Date of Patent: Dec. 10, 2002

(54) ELECTROMAGNETIC CONVERTER HAVING SUPERIOR ANTI-SHOCK PROPERTY

(75) Inventor: Tadao Yamaguchi, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 09/575,367

(22) Filed: May 22, 2000

(51) Int. Cl.[7] .............................. H04B 3/36; G10K 9/00

(52) U.S. Cl. .................. 340/407.1; 340/7.6; 340/388.1; 340/388.3; 340/388.6; 340/398.1

(58) Field of Search ............................... 340/407.1, 7.6, 340/388.1, 388.3, 388.5, 388.6, 388.8, 391.1, 398.1; 310/90.5

(56) References Cited

U.S. PATENT DOCUMENTS 4,843,628 A * 6/1989 Hofer ......................... 381/200
5,321,763 A * 6/1994 Lee ............................ 381/199
5,894,263 A * 4/1999 Shimakawa et al. ...... 340/388.1

FOREIGN PATENT DOCUMENTS

JP 2549375 6/1997

* cited by examiner

*Primary Examiner*—Donniel Crosland
(74) *Attorney, Agent, or Firm*—Leydig, Voit & Mayer, Ltd.

(57) ABSTRACT

An electromagnetic converter in which a mobile magnetic pole body supported by a thin spring is driven by an exciting coil. A restricting member limits movement of the spring so the spring is not deformed beyond a stress limit when the spring receives an impact. The electromagnetic converter produces a large vibration using a simple structure which can withstand an impact without increasing the strength of the spring so the weight of a mobile magnetic pole member can be increased. The restricting member is a soft elastic member and arranged either on the spring or at a location opposite the spring.

10 Claims, 4 Drawing Sheets

ELECTROMAGNETIC CONVERTER HAVING SUPERIOR ANTI-SHOCK PROPERTY

BACKGROUND OF THE INVENTION

1. Field of the Invention

The present invention relates to an improved electromagnetic converter used for mobile communications apparatuses, and more particularly, to an electromagnetic converter having a superior anti-shock property and a vibration generating structure having a mobile electrode supported by a relatively thin spring.

2. Description of the Related Art

A typical electromagnetic sound generating body as a coil means of mobile wireless communications apparatuses, is shown in FIG. 3. That is, a magnetic pole member 2 is fixed at the center of a resin case 1 and an exciting coil 3 is arranged around the magnetic pole member 2. Also, a field magnet 4 is arranged around the exciting coil 3, and a diaphragm 6 on which an armature member 5 is fixedly installed, facing the magnetic pole member 2, is arranged at the case 1.

Recently, due to the sometimes unwanted noise produced by a sound alarming means, mobile communications apparatuses are adopting a more discrete vibratory call means.

As a vibration generating means, a flat coreless vibratory motor is used in which an eccentric weight is installed on an output shaft of a compact DC motor or an eccentric rotor is used. A motor is used because vibration of a relatively large range is possible and efficiency is improved by using a centrifugal force only.

Instead of the vibratory motor, an electromagnetic converter for obtaining both sound and vibrations, as shown in FIG. 1 of Japanese Utility Model Registration No. 2549375, has been suggested. That is, as shown in FIG. 4, a mobile magnetic pole member 22 is made by installing a magnetic pole member at the center of a spring body 7 and an exciting coil 3 is arranged around the mobile magnetic pole member 22. By applying a current having a frequency of 100 Hz, for example, vibrations are obtained so that the mobile magnetic pole member 22 is moved up and down, in the view of the drawing.

Also, since the structure in which the diaphragm 6 having the armature member installed thereon is installed at the case 1 to face the mobile magnetic member 22, is the same as the structure with the sound generating body only of FIG. 3, the same reference numerals are used and a description thereof is omitted.

In the electromagnetic converter, by applying a relatively high frequency, for example, a current having a frequency of 2–3 KHz, to the exciting coil 3, the diaphragm 6 to which the armature member 5 is fixedly installed, is vibrated to generate sound. The mobile magnetic pole member 22 cannot vibrate in a range of 2–3 KHz.

Accordingly, both functions of sound generation and vibration may be performed according to the period of the current applied to the exciting coil 3.

However, to obtain the same amount of vibration as the centrifugal force of a compact DC motor, the size of the mobile magnetic pole member 22 needs to be increased or the weight thereof needs to be increased by partially adding an auxiliary weight such as tungsten alloy. When the weight of the mobile magnetic pole member 22 is increased, if the strength of a supporting spring is not increased, when it falls, the spring body 7 is deformed so that the mobile magnetic pole member 22 cannot maintain a predetermined position. Further, when the strength of the supporting spring is increased, a large amplitude cannot be obtained without increasing the input, which is not preferred in view of efficiency.

SUMMARY OF THE INVENTION

To solve the above problems, it is an objective of the present invention to provide an electromagnetic converter providing a large vibration, which can bear an impact without increasing the strength of a supporting spring, having a simple structure, and permits increasing the weight of a mobile magnetic pole member.

Accordingly, to achieve the above objective, there is provided an electromagnetic converter having a superior anti-shock property in which a mobile magnetic pole body supported by a thin spring is driven by an exciting coil and a restricting member is arranged such that the spring is not deformed beyond a stress limit when the spring receives an impact such as precipitation.

It is preferred in the present invention that the restricting member is formed of a soft elastic member.

It is preferred in the present invention that the restricting member is arranged at a mobile side.

It is preferred in the present invention that the restricting member is arranged at a fixed side.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
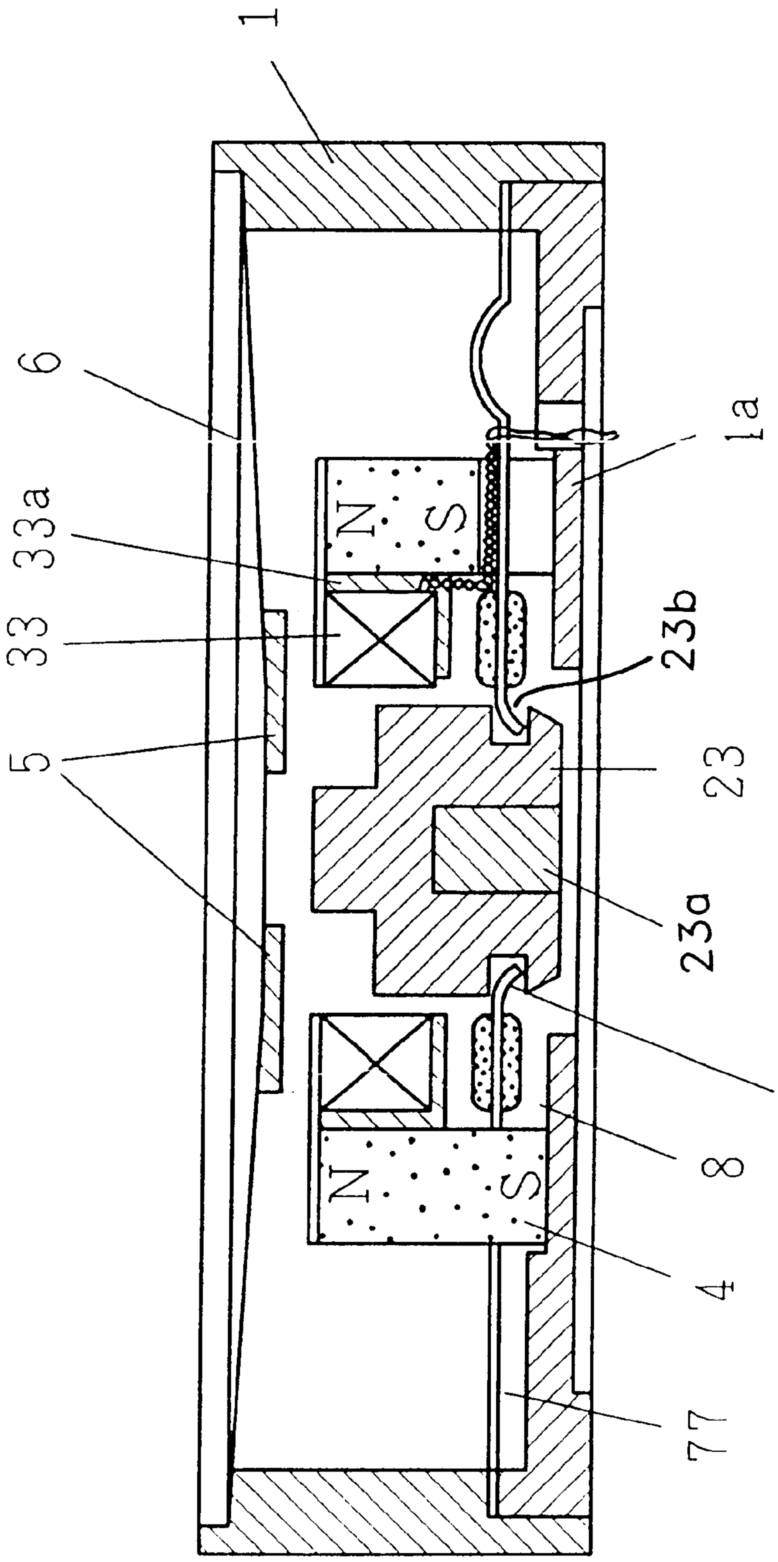
FIG. 1 is a sectional view showing the major parts of a magnetic convertor according to a first preferred embodiment of the present invention.

In FIG. 1, an auxiliary weight 23*a* formed of tungsten alloy is pressed into and inserted in the center of a mobile magnetic pole member 23. A support groove 23*b* is provided in the mobile magnetic pole member 23. A spring body 77 having a support portion 77*a* at one end thereof is inserted in the support groove 23*b* so that the mobile magnetic pole member 23 is supported by the spring body 77. A restricting member 8, which is a soft elastic body formed of rubber material, protruding upwards and downwards, is inserted around the spring body 77. Thus, precipitative impacts do not cause the spring body 77 to move up and down too much.

That is, the upward movement of the spring body 77 is stopped by a bobbin 33*a* around which an exciting coil 33 is wound, while the downward movement thereof is stopped by a cover 1*a* of a resin case 1. Thus, when the mobile magnetic pole member 23 is rather heavy, the spring body 77 can maintain its shape without exceeding its stress limit. In the drawings below, as the other members are the same as those of the conventional technologies, the same reference numbers are used and descriptions of those members are omitted.

Figure 2:
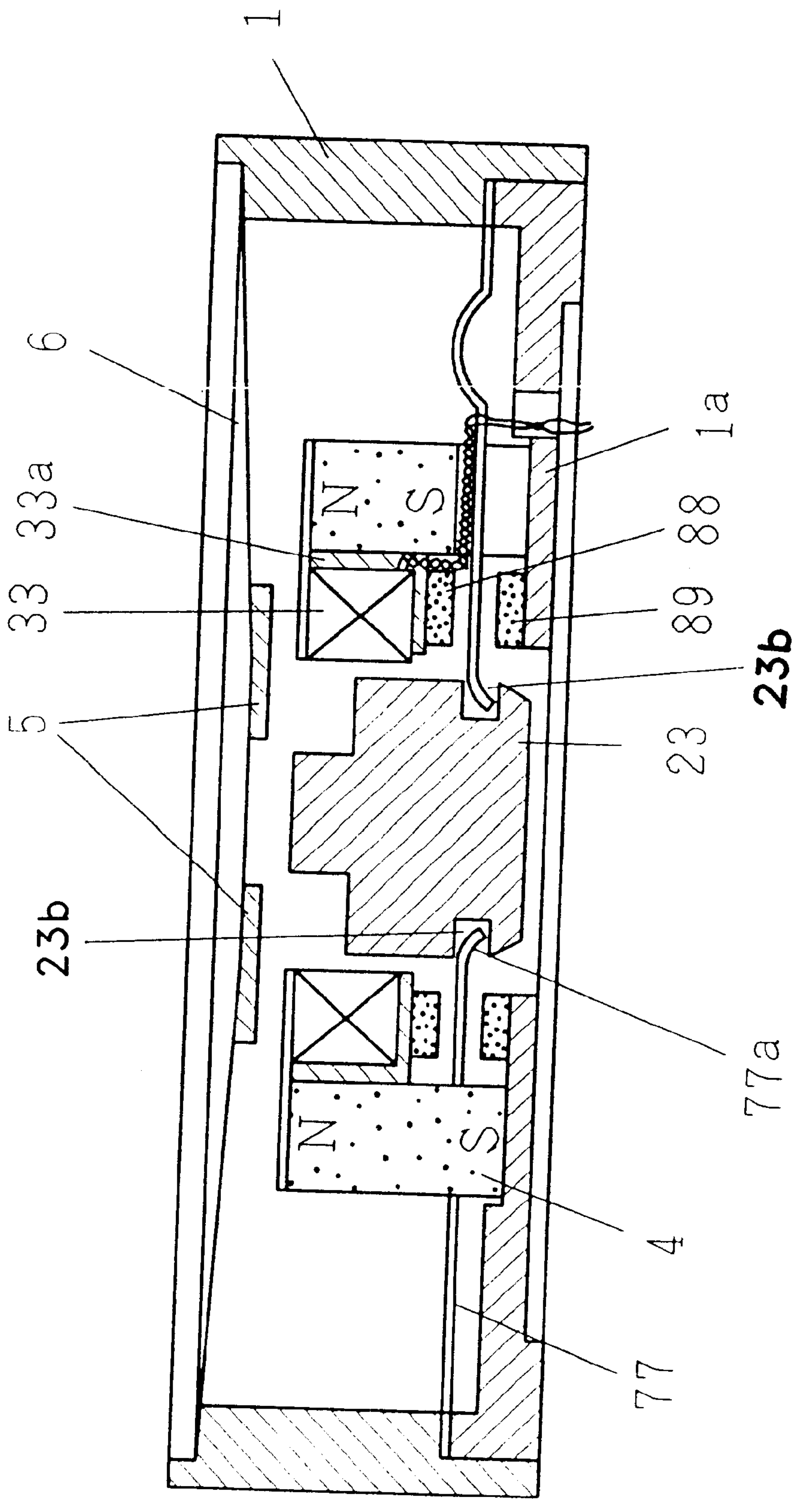
FIG. 2 is a sectional view showing the major parts of a magnetic convertor according to a second preferred embodiment of the present invention.
Figure 3:
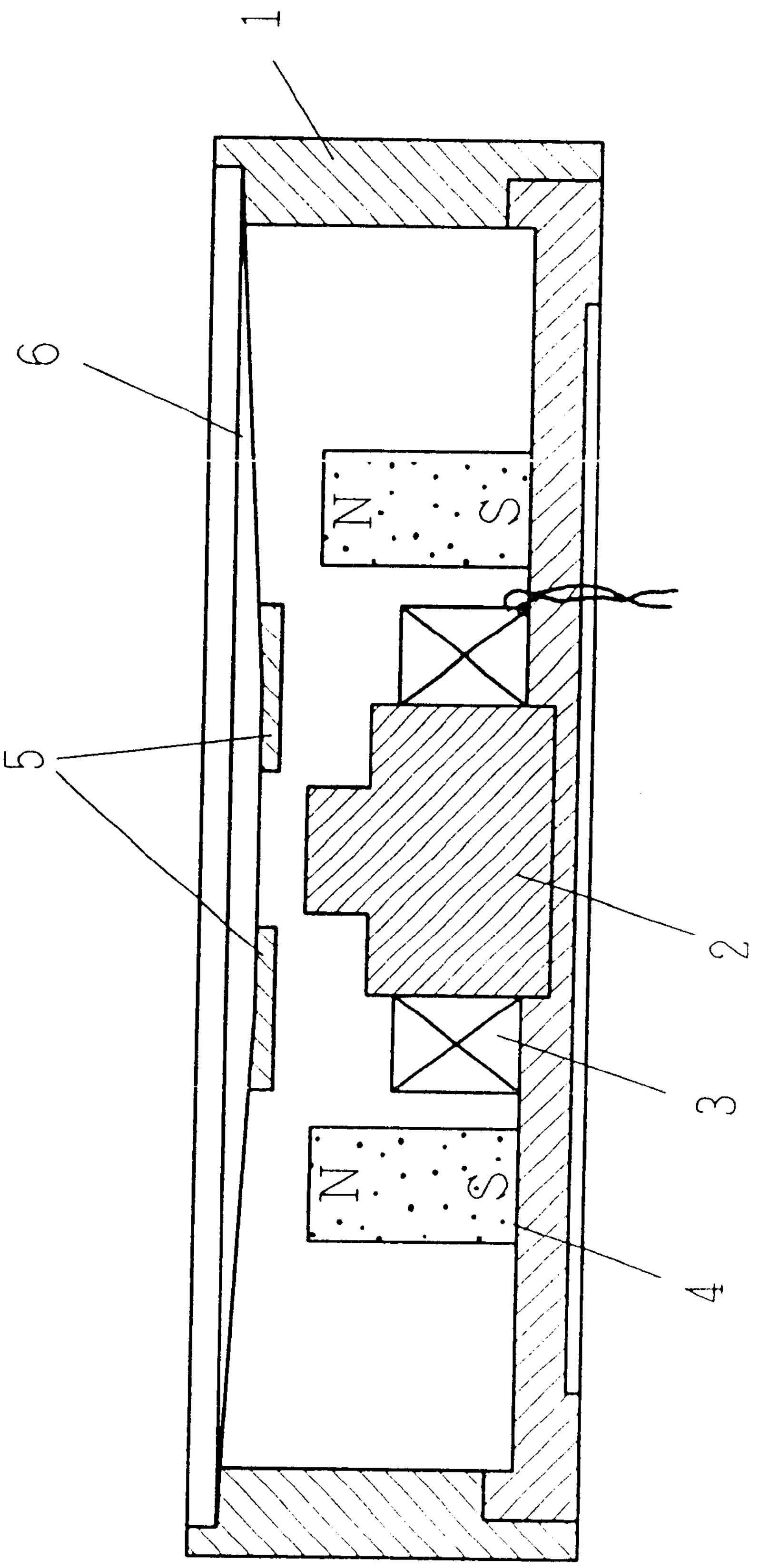
FIG. 3(PRIOR ART)
FIG. 3 is a sectional view showing the major parts of a conventional magnetic sound generating body.
Figure 4:
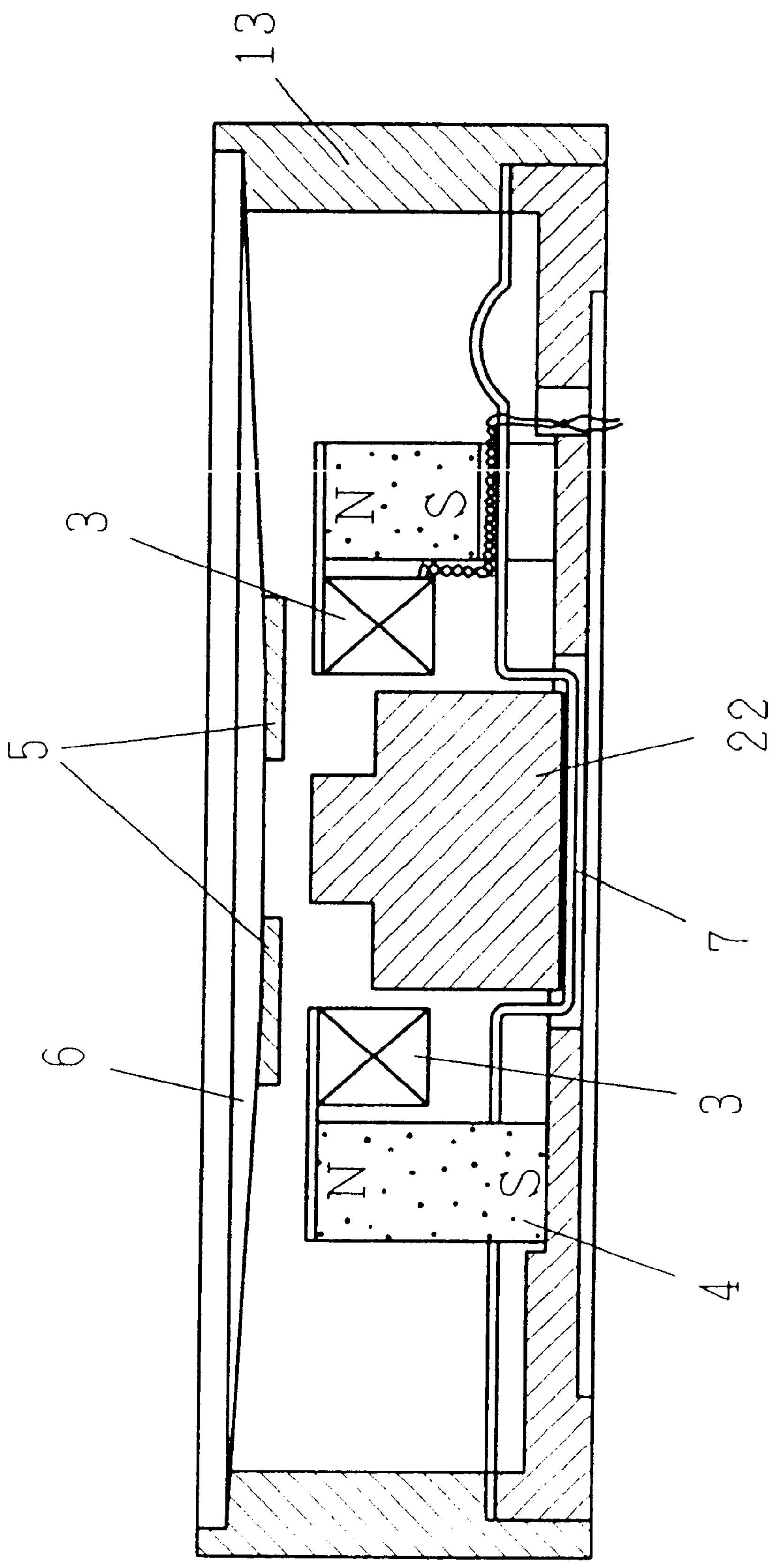
FIG. 4(PRIOR ART)
FIG. 4 is a sectional view showing the major parts of a conventional magnetic convertor.

FIG. 2 shows an electromagnetic converter according to a second preferred embodiment of the present invention. A pair of restricting member formed of a soft elastic body such as rubber or sponge are mounted on fixed elements. That is, the restricting member formed of such soft elastic body is divided such that a part 88 of the restricting member is located on the coil bobbin 33*a* and another part 89 is located on the cover 1*a*.

Accordingly, when there is an precipitative impact, the spring body 77 does not move up and down too much. When the mobile magnetic pole member 23 is rather heavy, the spring body 77 can maintain its shape without exceeding its stress limit.

Also, in the described embodiments, although the mobile magnetic pole member is a ferromagnetic body such as steel, the mobile magnetic pole member may be a magnet and the magnet arranged around the mobile magnetic pole member may be a ferromagnetic body such as steel.

It is noted that the present invention is not limited to the preferred embodiment described above, and it is apparent that variations and modifications by those skilled in the art can be effected within the spirit and scope of the present invention defined in the appended claims.

As described above, according to the present invention when an impact is received, the movement of the mobile magnetic pole member can be restricted to within a stress limit. Thus, the moving weight can be increased to increase the strength of vibration produced.

According to the present invention since shock is reduced when an impact is received, a mobile portion can be prevented from being deformed.

According to the present invention when the restricting member is located at the mobile side, in particular, at the spring body, vibration sounds of the spring body can be prevented.

According to the present invention when the restricting member is located at the fixed side, the structure of the spring body is not limited.

What is claimed is:

1. An electromagnetic converter converting electrical energy into mechanical vibrations including:

a housing having a top, a bottom, and at least one side joining the top to the bottom, an excitation coil mounted in the housing for receiving an electrical signal, a mobile magnetic pole body disposed within the excitation coil in the housing and vibrating along a direction transverse to the top and bottom of the housing in response to electrical excitation of the excitation coil, a leaf spring mounted in the side of the housing and supporting the mobile magnetic pole body for vibrating in response to electrical excitation of the excitation coil, and a restricting member limiting deflection of the spring toward the top and bottom of the housing so that the spring is not deformed beyond a stress limit when the spring responds to an impact applied to the housing.

2. The electromagnetic converter as claimed in claim 1, wherein the restricting member comprises a soft elastic member.

3. The electromagnetic converter as claimed in claim 1, wherein the restricting member is attached to the spring for impact against an element within the housing, upon deflection of the spring.

4. The electromagnetic converter as claimed in claim 2, wherein the restricting member is attached to the spring for impact against an element within the housing, upon deflection of the spring.

5. The electromagnetic converter as claimed in claim 1, wherein the restricting member is fixedly mounted within the housing, opposite the spring, for impact by the spring upon deflection of the spring.

6. The electromagnetic converter as claimed in claim 2, wherein the restricting member is fixedly mounted within the housing, opposite the spring, for impact by the spring upon deflection of the spring.

7. The electromagnetic converter as claimed in claim 3, wherein the restricting member comprises two resilient members disposed on opposite sides of the spring.

8. The electromagnetic converter as claimed in claim 4, wherein the restricting member comprises two resilient members disposed on opposite sides of the spring.

9. The electromagnetic converter as claimed in claim 5, wherein the restricting member comprises two resilient members mounted on respective elements within the housing and respectively spaced from opposite sides of the spring.

10. The electromagnetic converter as claimed in claim 6, wherein the restricting member comprises two resilient members mounted on respective elements within the housing and respectively spaced from opposite sides of the spring.

* * * * *